United States Patent
Chami et al.

(10) Patent No.: US 8,630,672 B2
(45) Date of Patent: Jan. 14, 2014

(54) MOBILE TELECOMMUNICATIONS NETWORK

(75) Inventors: Youssef Chami, Newbury (GB); David Lister, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 283 days.

(21) Appl. No.: 12/737,633

(22) PCT Filed: Jul. 31, 2009

(86) PCT No.: PCT/GB2009/050948
§ 371 (c)(1),
(2), (4) Date: Apr. 19, 2011

(87) PCT Pub. No.: WO2010/013055
PCT Pub. Date: Feb. 4, 2010

(65) Prior Publication Data
US 2011/0195730 A1    Aug. 11, 2011

(30) Foreign Application Priority Data

Aug. 1, 2008 (GB) .................................. 0814017.0

(51) Int. Cl.
*H04B 15/00* (2006.01)
(52) U.S. Cl.
USPC ........ 455/501; 455/517; 455/500; 455/67.11; 455/507; 455/561; 370/310; 370/328; 370/329; 370/338; 370/343
(58) Field of Classification Search
USPC ........... 455/501, 500, 517, 550.1, 67.11, 445, 455/522, 69, 68, 127.1, 403, 422.1, 426.1, 455/426.2, 443; 370/310, 328, 329, 338, 370/343
See application file for complete search history.

(56) References Cited

U.S. PATENT DOCUMENTS

| | | | |
|---|---|---|---|
| 2002/0111163 A1* | 8/2002 | Hamabe | 455/425 |
| 2007/0082620 A1 | 4/2007 | Zhang et al. | |
| 2007/0280183 A1 | 12/2007 | Cho et al. | |
| 2008/0146154 A1 | 6/2008 | Claussen et al. | |
| 2008/0146454 A1 | 6/2008 | Cuppoletti et al. | |
| 2008/0175185 A1* | 7/2008 | Ji et al. | 370/318 |

FOREIGN PATENT DOCUMENTS

| | | |
|---|---|---|
| EP | 1 811 686 A2 | 7/2007 |
| EP | 1 887 709 A1 | 2/2008 |
| GB | 2 445 989 A | 7/2008 |
| WO | WO2006/004968 A2 | 1/2006 |

(Continued)

OTHER PUBLICATIONS

3GPP TS 25.214 V8.2.0 (May 2008), $3^{rd}$ Generation Partnership Project; Technical Specification Group Radio Access Network; Physical layer procedures (FDD) (Release 8), 87 pp.
ETSI TS 125 331 V5.22.0 (Jul. 2008), Universal Mobile Telecommunications System (UMTS); Radio Resource Control (RRC); Protocol specification (3GPP TS 25.331 version 5.22.0 Release 5), pp. 1-50.

(Continued)

*Primary Examiner* — Keith Ferguson
(74) *Attorney, Agent, or Firm* — Muirhead and Saturnelli, LLC (57) ABSTRACT

In a mobile telecommunications network, a mobile terminal is prevented from communicating at a level that would introduce an unacceptable level of interference at a neighboring base station by introducing a received signal threshold criteria at its base station that can adapt to the variation in signal levels at its base station and its neighbors.

21 Claims, 3 Drawing Sheets (56) References Cited

FOREIGN PATENT DOCUMENTS

| WO | WO2006/099547 | A1 | 9/2006 |
| WO | WO2008/030867 | A2 | 3/2008 |
| WO | WO2008/030897 | A2 | 3/2008 |

OTHER PUBLICATIONS

ETSI TS 125 331 V6.18.1 (Oct. 2008), Universal Mobile Telecommunications System (UMTS); Radio Resource Control (RRC); Protocol specification (3GPP TS 25.331 version 6.18.1 Release 6), pp. 1-50.

* cited by examiner

MOBILE TELECOMMUNICATIONS NETWORK

TECHNICAL FIELD

This application relates to a method of controlling a mobile terminal, and more particularly to a method of controlling a mobile terminal in a mobile telecommunications network including macro base stations and micro base stations, particularly in order to mitigate uplink interference. This application also relates to a base station for use in such a mobile telecommunications network, and in particular a micro base station for use in controlling which mobile terminals utilise it as a telecommunications network access point.

BACKGROUND TO THE INVENTION

There have recently been proposals to allow access to the features and services provided by cellular networks, such as GSM and UMTS networks, other than by accessing those networks in the conventional manner. In this regard, the conventional manner is by signalling between a mobile terminal and a conventional base station (macro base station) that has a dedicated connection to a Mobile Switching Centre (MSC). It has been proposed to increase network capacity by providing additional special base stations, referred to as access points (APs), for example at a subscriber's home or office. Many different names have been given to APs, such as home access points (HAPs), HomeNodeB, micro base stations, pico-base stations, pico-cells and femto-cells, but all names refer to the same apparatus. APs provide short range, localized cellular telecommunications coverage, and are typically purchased by, or rented to, a subscriber to be installed in their house or business premises.

These types of base stations may be dedicated network access points, or may be enhanced wireless internet hubs (i.e. providing wireless internet access, as well as wireless telecommunications network access). The range of an AP is significantly smaller than macro base stations, typically only providing coverage of the order of 20 to 30 meters.

It has also been proposed to use APs in the Long Term Evolution (LTE) telecommunications network currently being developed, but not yet implemented. LTE is likely to be the next network implementation after 3G. Overall, the invention is applicable to any type of cellular telecommunications system, including GSM, 3G and LTE.

An advantage of introducing APs in existing telecommunications networks is that a higher quality of service can be offered to a customer, such that the AP can deliver higher throughput services at a lower cost. Further, where sufficient numbers of APs are implemented, the power level of the macro coverage could be reduced, due to a lower demand for the macro-base stations. Power reductions of course result in energy and financial savings, for instance due to less spectrum being required and also less hardware.

A further advantage of using an access point connected to the core network via an IP network is that existing broadband Digital Subscriber Line (DSL) connections can be used to link mobile terminals with the network core without using the capacity of the radio access network or transmission network of a mobile telecommunications network. In other words, the AP is integrated into a DSL modem/router and uses DSL to backhaul the traffic to the communication network.

A still further advantage is that APs are able to provide mobile network access to areas where there is no macro radio access network coverage. For example, an AP could provide 3G coverage in an area where there is no macro 3G coverage at all, perhaps only macro GSM coverage. The use of APs as an additional or alternative means for accessing the network therefore advantageously increases the network capacity.

However, additional challenges arise in implementing these access points in a well-integrated telecommunications network. For instance, in areas where one or more access points coexist with a macro base station (i.e. the access points and the macro base station both provide coverage to the given area), and where both an access point and the macro base station are operating on the same frequency channel, interference is an issue. In this regard, whilst access schemes like WCDMA use multiplexing to prevent users of the cell from interfering with each other, thereby providing intra-cell orthogonality, the same does not apply inter-cell. Therefore, users in an AP cell may interfere with neighbouring and/or overlapping macro-cells where the same carrier frequency is utilised, since users of each of these cells are not time and/or frequency multiplexed with respect to each others.

For instance, a mobile terminal (UE) using an AP may cause significant capacity reduction on the uplink on the surrounding macro cell when both the AP and the macro base station are using the same WCDMA carrier. Similarly a UE on the macro cell may degrade the performance of UEs using the AP. This problem is normally avoided by the operation of handover in which a UE will communicate with the base station which provides the best radio link. This will generally work in networks with only macro base stations. However in networks also including APs, an AP may not always permit a UE to handover to, or from, another base station and so performance degradation can result.

As an example situation of an AP not permitting handover, an AP may be a closed AP (i.e. only a dedicated list of subscribers are allowed on closed APs) and therefore not permit an unauthorised user to connect to it, even if it provides that user with the best available coverage. Therefore, in this situation the UE may not be connected on the best radio link, and as a result, the UE may increase its operating power in order to compensate, which will particularly affect an adjacent base station providing better coverage. This increase in operating power is likely to cause interference on the adjacent base station, which could be particularly acute if the power increase is large.

Further, the interference problem may occur when a UE is using an AP in a location where a macro base station provides good coverage, and the AP provides a lesser coverage. In this regard, it may be beneficial for the UE to stay connected to the AP, for instance to utilise a DSL connection to backhaul the traffic, or to make use of a preferential tariff offered when the AP is used. However, the lesser coverage of the AP, and the visibility of the macro base station offering good coverage is likely to result in the UE creating uplink interference to the macro base station.

Whilst one solution would be to operate the macro base stations on one carrier, and the micro base stations on another, spectrum is an expensive commodity, and it would not be financially viable to dedicate a whole frequency carrier for use by APs.

In this regard, it has been recognised that a major source of uplink interference is caused by UEs transmitting with excessive power in locations in which the UE is communicating with a base station, or AP, that provides a lesser degree of coverage than its neighbour.

There is therefore a need to provide an improved communication environment in order to allow base stations to better coexist on the same carrier. In particular, there is a need for an improved communication environment in order to allow macro base stations to better coexist with other smaller type of base station including APs on the same carrier.

BRIEF SUMMARY OF THE INVENTION

According to a first aspect of the system described herein, there is provided in a mobile telecommunications network including a mobile terminal, a first base station and one or more adjacent base stations, a method of mitigating interference to the one or more adjacent base stations where the mobile terminal is configured to communicate with the network via the first base station, the method including: determining a first parameter value indicative of a maximum acceptable level of interference by the mobile terminal on the adjacent base station; and using the first parameter value to determine a maximum operating threshold of the mobile terminal for communications with the first base station.

The method may further include estimating an operating parameter level of the mobile terminal for a communication with the first base station in relation to a given service; comparing the operating parameter level and the threshold; and where the operating parameter level exceeds the threshold, not proceeding with the communication.

In this way, the threshold may be determined using signal parameter measurements of the mobile terminal relative to the first base station and the adjacent base station.

Therefore, this allows the uplink interference problem for macro base stations, as caused by UEs operating at high power through an AP, to be addressed by constraining the maximum power at which the UE operates. Preferably the UE is constrained to a level which has a minimal impact, or at least a reduced impact, on the macro base station.

This constraint may be imposed by the introduction of a control algorithm at the AP that is able to adapt depending on the received signal power at the UE from the AP relative to received signal power at the UE from its neighbours, including macrocells.

BRIEF DESCRIPTION OF THE DRAWINGS

Embodiments of the system described herein will now be described in relation to the Figures in which.

DETAILED DESCRIPTION Of VARIOUS EMBODIMENTS

Figure 1:
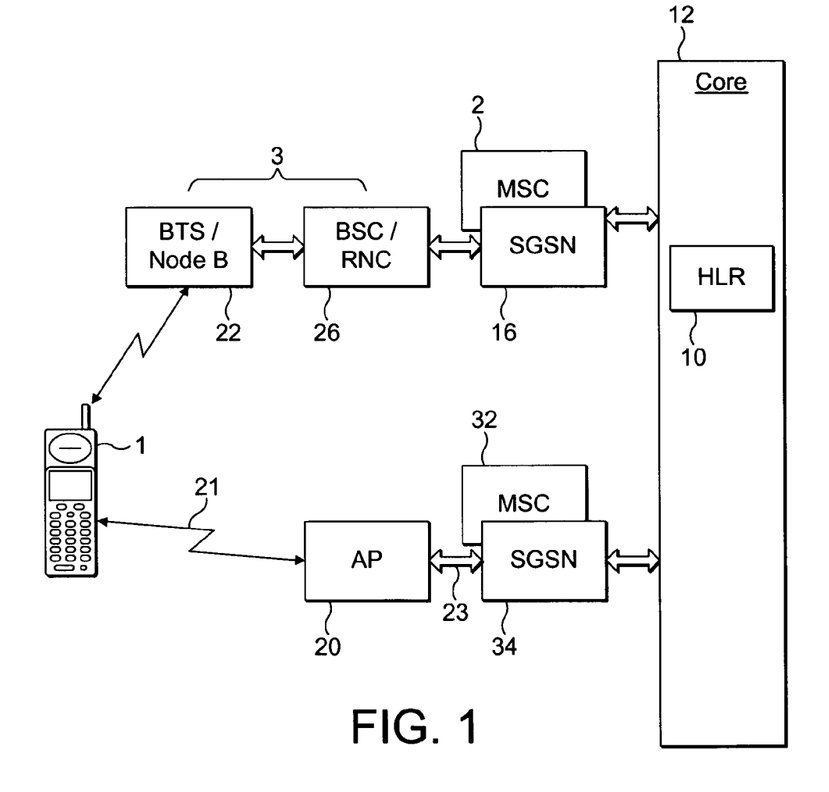
FIG. 1 illustrates an example mobile telecommunications network including an access point in addition to a conventional base station, in which the embodiments of the system described herein may be implemented.

Certain elements of a mobile telecommunications network, and its operation, will now briefly be described with reference to FIG. 1.

Each base station (e.g. base station 3 and AP 20) corresponds to a respective cell of the cellular or mobile telecommunications network and receives calls from and transmits calls to a mobile terminal in that cell by wireless radio communication in one or both of the circuit switched or packet switched domains. Such a subscriber's mobile terminal (UE) is shown at 1. The mobile terminal may be any portable telecommunications device, including a handheld mobile telephone, a personal digital assistant (PDA) or a laptop computer (e.g. equipped with a mobile network datacard).

In a GSM mobile telecommunications network, each base station 3 comprises a base transceiver station (BTS) 22 and a base station controller (BSC) 26. A BSC may control more than one BTS. The BTSs and BSCs comprise the radio access network.

In a UMTS mobile telecommunications network, each base station 3 comprises a node B 22 and a radio network controller (RNC) 26. An RNC may control more than one node B. The node Bs and RNCs comprise the radio access network.

Conventionally, in a GSM/UMTS network, the base stations are arranged in groups and each group of base stations is controlled by a mobile switching centre (MSC) 2 and an SGSN (Serving GPRS Support Node) 16. MSC 2 supports communications in the circuit switched domain—typically voice calls, and corresponding SGSN 16 supports communications in the packet switched domain—such as GPRS data transmissions. SGSN 16 functions in an analogous way to MSC 2. The base station 3 has a dedicated (not shared) connection to its MSC 2, typically a cable connection. This prevents transmission speeds being reduced due to congestion caused by other traffic.

In the proposed LTE mobile telecommunications network, each base station 3 comprises an eNode B, which effectively combines the functionality of the node B and the RNC of the UMTS network. It is also proposed that the base stations are arranged in groups and each group of base stations is controlled by a Mobility Management Entity (MME) and a User Plane Entity (UPE).

The radio link 21 from the AP 20 to the mobile terminal 1 uses the same cellular telecommunication transport protocols as the conventional base station 3 but with a smaller range—for example 25 m. The AP 20 appears to the mobile terminal 1 as a conventional base station, and no modification to the mobile terminal 1 is required to operate with the AP 20. The AP 20 performs a role corresponding to that of macro base station 3.

Communications between the access point 20 and the core network 12 are preferably IP based communications, and may be, for example, transmitted over a broadband IP network (and routed via the Internet). The communications are routed via MSC 32 or SGSN 34, as applicable. The access point 20 converts the cellular telecommunications transport protocols used between the mobile terminal 1 and the AP 20 to IP based signalling.

The connection 23 between the access point 20 and the core network 12 may use the PSTN telephone network. Typically a DSL cable connects the access point 20 to the PSTN network. The data is transmitted between the access point 20 and the core network 12 by IP transport/DSL transport. The bandwidth of the cable connection between the access point and the telephone exchange is shared with multiple other users.

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and the network core 12.

AP 20 may be configured to serve any applicable telecommunications network, including GSM, UMTS and LTE networks.

The owner of AP 20 can prescribe whether the AP is either open or closed, whereby an open AP is able to carry communications from any mobile device in the telecommunications network, and a closed AP is only able to carry communications from specific pre-designated mobile devices.

Figure 2:
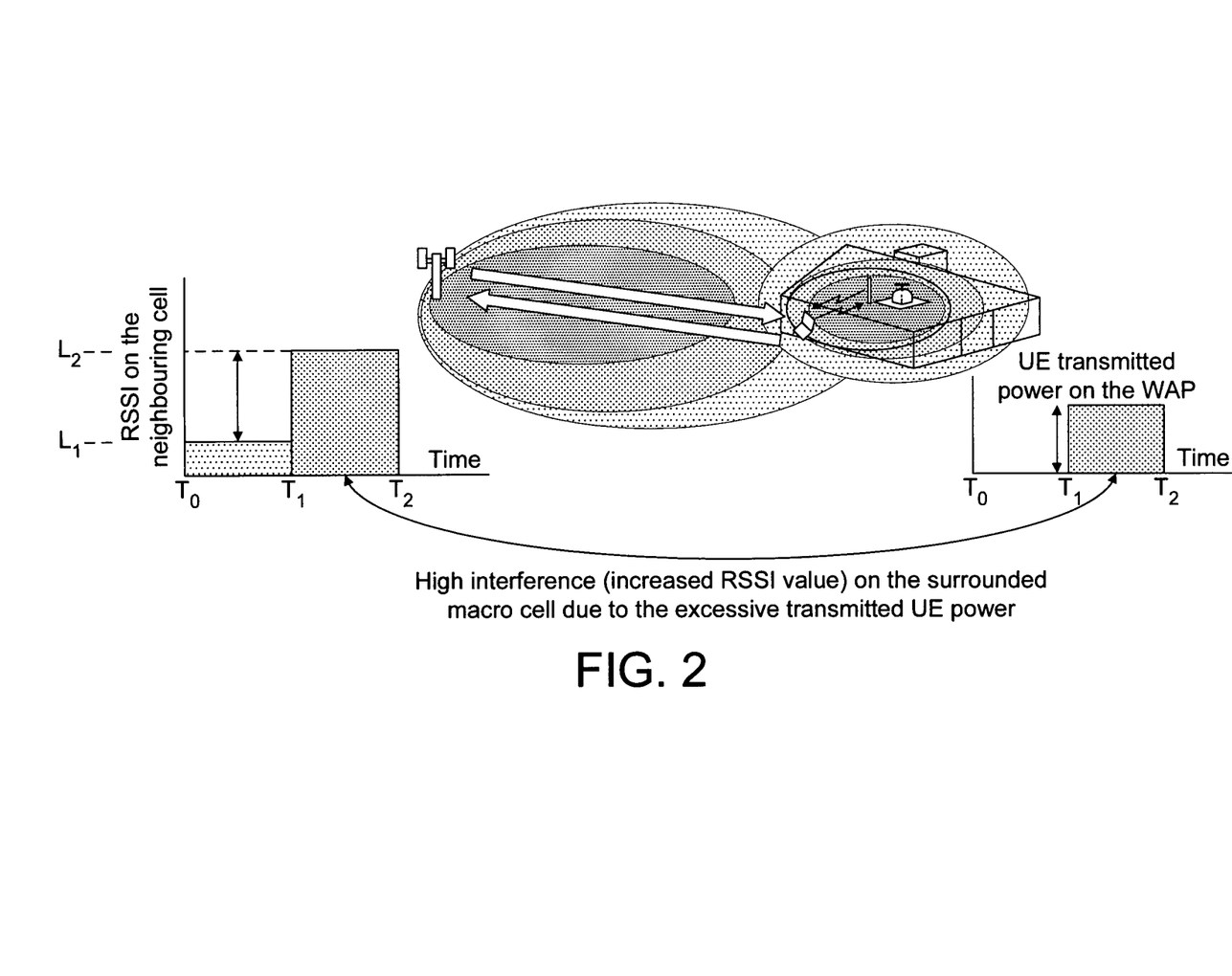
FIG. 2 illustrates the impact a UE operating through an AP may have on the macro network in terms of uplink noise.

With reference to FIG. 2, an example of the problem of operational interference on macro cells, as caused by UE operating in close, adjacent cells is illustrated.

In FIG. 2, an AP is shown with an adjacent macro base station, whose cell overlaps the AP's cell. A graph of transmission power over time is shown in relation to a mobile terminal become active, and communicating with the AP. From time T0 to T1, no power is transmitted, since the terminal is not active, then from time T1 to T2, the terminal becomes active, and the transmission power jumps up to an active level. A corresponding graph of RSSI (Received Signal Strength Indicator) for the macro cell is also illustrated, where the RSSI is an indication of interference on the macro cell. Received Total Wide-Band Power (RTWP) can be also used in conjunction or in isolation to RSSI. From time T0 to T1, the RSSI is at a first, minimal level L1. The terminal is not transmitting during this time, so it is not causing interference of any significance on the macro cell. Then, from time T1 to T2, once the terminal becomes active, the RSSI on the macro cell increases significantly from L1 to L2, showing that high interference at the macro cell is occurring due to the power being transmitted by the mobile terminal.

It is to be appreciated that this problem is heightened in cellular networks with APs, as distinct from traditional macro-cell only networks, since in the traditional networks a UE would normally hand over to the base station providing the best coverage and so inter-cell interference is essentially only an issue at the cell edges which is only a small component of the overall cell coverage. Where APs are utilised and hand over is not possible, there will be more situations where a UE is communicating with the cell which does not provide the best level of coverage. In addition a UE communicating with an AP may have to overcome high levels of interference generated by other UEs communicating with neighbouring macro cells. Once the use of APs becomes more widespread, it is quite possible that a single macro-cell will also have multiple APs operating within its cell, so inter-cell interference will be more of an issue due to the greater number of potential interference sources. Further, the use of a Hierarchical Cell Structure (HSC) will amplify the interference issue as the AP may be prioritised over a macro cell for reselection in the Idle mode, which may not be necessarily the best cell in term of coverage for the mobile to select to camp on.

With this background in mind, implementations of embodiments of the invention will now be described, which seek to address inter-cell interference between an AP cell and a macro-cell operating in the same frequency channel.

To illustrate a first embodiment of the invention, UE 1 is idle and camped on a base station. The base station upon which the UE is camped will typically depend upon the strength of RSSI measurements received from base stations in the UE's vicinity, including macro and micro base stations. In this example, the base station which provides UE 1 with the strongest signal is AP 20, and therefore UE 1 has registered with AP 20, via a LAU request, so that it is now "camped on" AP 20.

When UE 1 initiates a communication, it will transition from idle mode to active mode and transmit a communication set up request to AP 20, with which it is registered. The exact signalling of such a request, for example 3GPP 25.214, is not essential to the invention, and will not be further described here.

Upon AP 20 receiving the communication set up request, according to this embodiment of the invention, the AP will determine whether or not to accept the request, base on the communication's likely effect on the network. This determination may occur for all communication request received by the AP, or only select ones, such as requests where the UE's RSSI already exceeds a predetermined threshold.

The communication request will include information detailing the service required by the UE (e.g. a voice call, SMS, data download, streaming service etc). The request may also include a standard or Quality of Service (QoS) indication required by the UE for the requested service. Alternatively, however, this may be determined by the AP based upon the service requested (i.e. a voice call will inherently require a better QoS than an SMS communication). To assist with this determination, the AP will obtain signal parameter measurements (e.g. RSSI) relating to one or more base stations adjacent to the UE.

Where the UE is not currently configured to transmit such measurements to the network, such as is usually the case when the UE is in idle mode, it will be necessary for the UE/AP to be reconfigured/adapted so that the required measurements can be provided. For instance, upon the AP receiving a new communication request from the UE, if signal parameter measurements are not yet available, the AP may request the information from the UE. Alternatively, the network may obtain the measurements from other sources.

Once the AP has the necessary signal parameter measurements, it is in a position to perform the necessary calculations in determining whether or not to allow a communication requested by the UE. That is, the AP will determine whether or not to allow the communication request, after considering the existing environmental factors at that point in time.

In this regard, the AP determines the maximum operational power required by the UE. Where the maximum required operational power is determined to be likely to cause undue interference to a neighbouring base station, the AP will decide not to proceed with the communication request. That is, it is only where the maximum required power is within an allowable interference range that the communication will be proceeded with.

The control of the maximum power is realised by introducing a variable control algorithm which sets a signal threshold at the AP that is preferably derived from consideration of the neighbouring cell coverage, and allowed incremental noise rise at a neighbouring base station.

Figure 3:
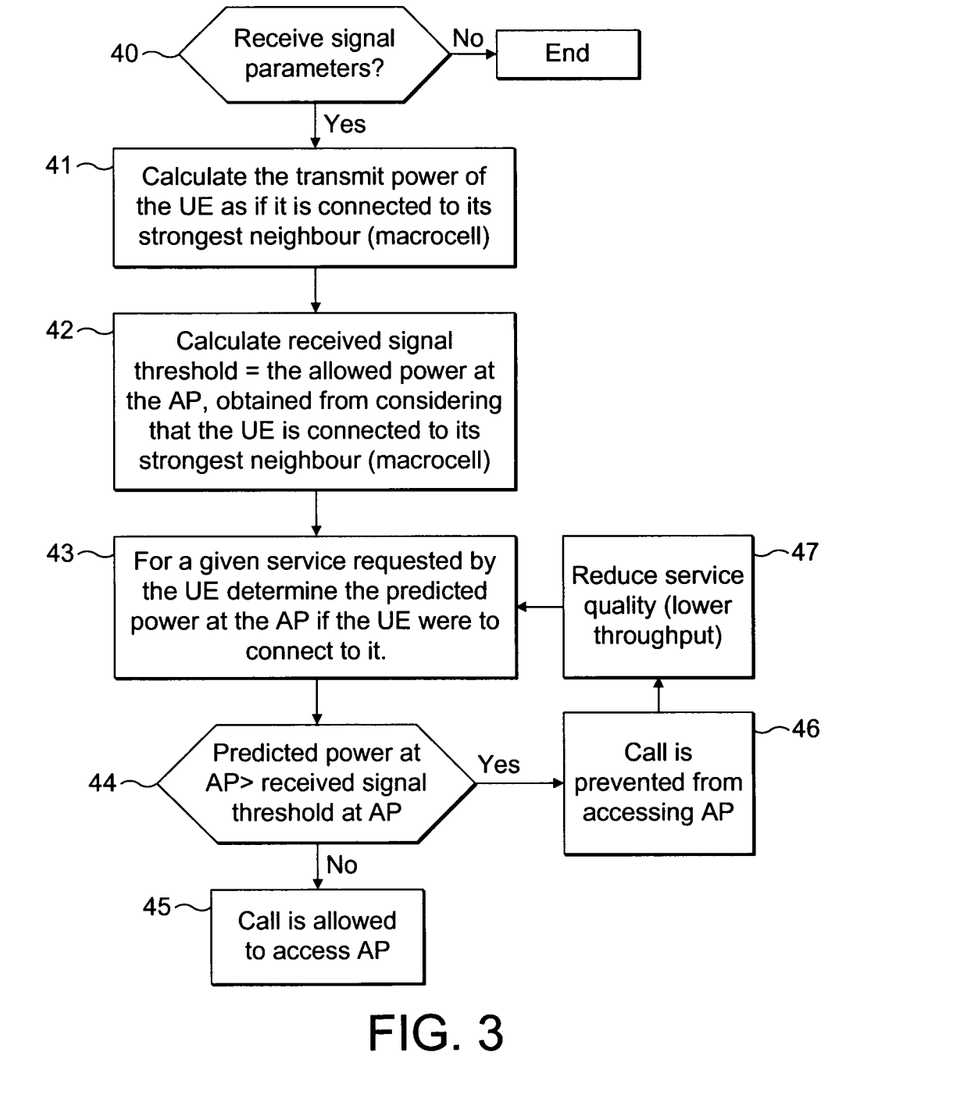
FIG. 3 illustrates a flowchart outlining an implementation of an embodiment of the system described herein.

The implementation of this embodiment will be further described in relation to the flowchart of FIG. 3.

After the AP has obtained the signal parameter measurements (step 40), the AP will proceed to calculate the maximum power that should be transmitted by the UE when communicating through the AP (step 41). This maximum power effectively corresponds to the maximum interference that would be acceptable to any neighbouring base station (although typically only calculated in relation to the neighbouring base station with the highest RSSI). This estimate of maximum power (step 41) can be obtained by performing the following calculation:

$$\text{Maximum Transmit power (dBm)} = \text{Target Received Power at neighbour (dBm)} + \text{Pathloss to neighbour (dB)} + \text{Correction Factor(constant 1)} \quad (1)$$

The Target Received Power at the neighbouring base station corresponds to the maximum allowed noise level that is deemed acceptable at the neighbouring base station without compromising coverage or capacity significantly. This Target Received Power can be obtained from the core network or via a network element controller, and represents the maximum acceptable level of the power (i.e. noise+interference) at the neighbour cell. Alternatively, a default value could be set that is representative, for example, of the normal operating region of AP 20's closest neighbouring cell.

The Path-loss to the neighbour can be derived by AP 20 by subtracting the downlink Received Signal Strength Level of the neighbour cell (as reported to AP 20 by the UE) from the actual transmit power of the neighbour cell. The transmit power of the neighbour can be obtained from the core network, via a network element controller, or set to a default value that is representative of a normal setting for that cell.

The Correction Factor (constant 1) is a configurable parameter introduced to optimise the maximum power value of the UE before a particular action is to be considered.

After calculating the Maximum Transmit Power of the UE, the next step is to calculate a received signal threshold at the AP (step 42). This threshold fixes the maximum power that is allowed to be received at the AP, based upon the neighbour cell's maximum noise level to be tolerated, and in doing so constrains the UE from transmitting at a power that would otherwise cause interference to its neighbouring cells.

An estimate of the threshold (step 42) can be calculated by performing the following calculation:

$$\text{Received signal threshold at } AP \text{ (dBm)} = \text{Transmit power (dBm) (41)} - \text{Pathloss to } AP \text{ (dB)} + \text{Correction Factor(constant 2)} \quad (2)$$

The transmit power (41) is obtained from the previous calculation in equation (1).

The pathloss to the AP (dB) can be calculated at the AP by subtracting the received signal power on the broadcast channel from the known transmit power of the broadcast channel.

The Correction Factor (Constant 2) is a configurable parameter used to correct the Received Signal Level Threshold at the AP. This correction factor can also be used to compensate cable loss or deduct the antenna gain of the AP.

Once the signal threshold at the AP has been calculated, the AP will then determine an estimation of what the actual received power (43) would be, if the UE were to connect to it. An estimate of the actual received power (43) can be obtained by the following calculation:

$$\text{Power level at } AP \text{ (dBm)} = \text{Noise floor (dBm)} + SINR \text{ (dB)} + \text{Correction Factor(constant 3)} \quad (3)$$

Where "noise floor" (dBm) is typically known at the AP, and includes both the thermal noise, and any external noise and interference. This measure also accounts for any instances where the noise floor at the AP has been increased due to a UE connected to a neighbour cell that may be in the vicinity of the AP.

The Signal to Interference plus Noise Ratio (SINR) is the ratio of required signal to interference plus noise for a particular service, and can be calculated at the AP from knowledge of the required service data rate and required energy per information bit. The SINR describes the relative signal level against interference and noise at which a signal can be detected. For example, a given service may require an SINR of at least −10 dB. This means that the received signal has to be no less than 10 dB below the existing interference and noise at the base station. As this measure is a ratio, it requires to be added to the reference noise floor to obtain an absolute power level.

The Correction Factor (constant 3) is configurable per AP in order to correct any variance in the Noise floor between the actual and estimated values.

Given the AP has now determined the received signal threshold (42) and the predicted power that the UE would generate at the AP if it were to connect to it (43), the AP can then make a decision on whether the UE would be allowed to connect (44). If the predicted received power at the AP were to be less than the received signal threshold, then the UE would be allowed to connect (45).

If the UE's predicted received power at the AP were to be greater than the received signal threshold, then the UE would be prevented from connecting (46). In such a case, the AP may negotiate a lower service level with the UE, such as by reducing the requested throughput. The AP would be required to calculate the predicted received power (43) at the lower service level and consider once again whether to admit the call with this service level (44).

By taking into account a maximum acceptable power level at the neighbouring base station, and relative path losses based on the UE's position relative to the neighbouring base station and the AP, a variable threshold level can be achieved which reflects the relative coverage level of the base stations in the UE's vicinity, and which also addresses the problem of high levels of operational interference that the UE may generate.

It can also be seen that whilst the received signal threshold can be used to determine whether a UE can connect to the AP at call set up, the same approach can be used whilst the call is in dedicated mode.

Therefore, according to a second embodiment of the invention, the principle of the invention can be applied to the situation of UE 1 in active mode, communicating through AP 20. When in active mode and using AP 20, the UE will forward measurements, such as Received signal strength measurements relating to neighbouring base stations in the UE's vicinity, to AP 20.

It is not usual for UEs to continuously transmit signal parameter measurements to the network upon becoming active; a trigger is usually required before this procedure commences, such as a predefined UE transmitted power threshold (3GPP 25.331 Release 5 and 6). Therefore, once the UE exceeds this predefined threshold, it commences reporting parameter measurements to the network. These parameter measurements typically include measurements relating to neighbouring cells and its serving cell, such as Ec/Io (i.e. Energy per chip/total Interference (dB)), which provides a measure of coverage/interference, and RSCP (received signal code power) from the P-CPICH (Primary Common Pilot Channel), which provides a measure of signal strength.

Conventionally measurements such as these have been used to instigate handover, and handover can still be triggered towards a detected neighbouring cell with the best coverage, signal quality and/or pathloss, as required.

Where the signal quality and coverage received at the AP from the UE degrades, it is normal operation for the AP to instruct the UE to increase its transmit power as the received signal power or quality at the AP decreases. This increase in transmit power overcomes the increasing path loss between the UE and the AP, and any external interference sources that are observed at the AP. In normal operation the UE can be instructed to increase its transmit power until it reaches its maximum power level, which is determined by the physical constraints/properties of the device. This therefore maximises the UE's ability to stay connected to the AP in degrading conditions.

However, as the UE 1 increases its uplink signal power in order to continue to communicate with AP 20, the resulting high power levels are likely to significantly impact on the radio resources in the up-link on the surrounding/neighbouring macro base station 3.

Therefore, to address this problem in dedicated/active mode, the AP will regularly perform the steps (40)-(47) in order to ensure the transmit power of the UE does not exceed an applicable threshold level that would generate high levels of interference on its neighbours. If the received power at the AP exceeds the received signal threshold, the AP will lower the service offered to the UE, force the UE to handover to surrounding macro cell or alternatively drop the connection.

This embodiment of the invention is particularly applicable to the situation of a UE being connected to an AP, with a macro base station existing in the vicinity. Where the coverage provided by the macro cell is good, and the coverage provided by the AP is reasonable, it may nevertheless be desirable for the UE to retain such communication through the AP for as long as possible, for instance to make use of reduced call tariffs offered by their service provider for using the AP. This maintained connection however, should not be to the detriment of the other network elements, and the present invention addresses this, by ensuring that the UE's interference effect on the network is kept within acceptable limits.

In other words, the UE is prevented from transmitting at a power that would otherwise increase the level of interference at the macro cell base station. If the UE was not restricted in the power that it can transmit when communicating with the AP, the resulting interference generated at the macro cell may be so high as to cause the macro cell to become blocked. In such a case, the macro cell would be unable to communicate with any UEs in its coverage area, and would result in a significant capacity reduction on the system as a whole.

The embodiments of the invention have been described in relation to the AP calculating the maximum power that should be transmitted by the UE, and then the power that would be transmitted by the UE for the communication requested. It is not however, essential to the invention that the steps be performed in this order.

The embodiments of the invention have been described in relation to using Received Signal Strength measurements, however any other appropriate measurements, estimates or signal parameters may be utilised.

The embodiments of the invention have been predominantly described in relation to an AP performing the calculations, with a view to preventing interference to a proximate macro base station. This is only an example configuration, and the AP may also be taking into consideration interference with other APs. Alternatively, the calculations may be performed by a macro base station, preventing interference with other macro base stations and/or micro base stations.

Further, the calculations may be performed by any suitable means, including an engine associated with the AP, the mobile terminal itself, or an element of the core network.

The principle of the invention has only been described in relation to an AP monitoring its active UEs, and also deciding whether to accept communications from UE's transitioning from idle to active. Other uses are possible, however, include AP's deciding whether to accept a handover of a UE from a neighbouring cell and also for UEs to decide whether or not to perform a LAU to an alternative AP/macro base station, when idle.

Particular advantages of the embodiments of the invention include the following:

The maximum UE power is constrained in a dynamic way.
The received signal threshold at the AP is adjusted in a dynamic way.
The proposed algorithm can be applied at call set up, and during dedicated mode (whilst the call is active).
The received signal threshold considers the relative coverage levels of surrounding neighbours.
The received signal threshold considers the noise floor at the neighbours base station.
The received signal threshold accounts for increases in the noise floor at the AP which may arise due to external interference (for example, a UE that is connected to a neighbour providing better coverage but which still has visibility to the AP).
The AP can negotiate with the UE a lower service request, and then admit the UE if its received power is less than the threshold level at the AP.
The supporting information required to determine the received signal threshold (such as neighbours transmit power, and neighbours noise floor) can be set to default values by the operator of the AP.
By defining the neighbours noise floor, the operator can control what acceptable level of interference at the neighbour can be tolerated.
Alternatively the required information (neighbours transmit power, and neighbours noise floor) can be obtained from the core network, via a centralised network element manager.
The received signal threshold can adapt during the duration of a connection. If the received power exceeds the received signal threshold whilst in active mode, the service delivered to the UE will be degraded, or the call should be dropped.

Other, embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. In a mobile telecommunications network including a mobile terminal, a first base station and one or more adjacent base stations, a method of mitigating interference to the one or more adjacent base stations where the mobile terminal is configured to communicate with the network via the first base station, the method comprising:
   determining a first parameter value indicative of a maximum acceptable level of interference by the mobile terminal on the adjacent base station;
   using the first parameter value to determine a maximum operating threshold of the mobile terminal for communications with the first base station;
   estimating the operating parameter level of the mobile terminal for a communication with the first base station for a given service upon receiving a communication set up request for the given service; and
   where the estimated operating parameter level exceeds the threshold, not allowing the communication set up request.

2. The method of claim 1, further comprising:
   where the estimated operating parameter level exceeds the threshold, offering the mobile terminal a lower service quality and wherein the step of not allowing the communication is performed in dependence on the mobile terminal not accepting the lower service quality.

3. The method of claim 1, wherein the first parameter value is determined using a parameter dependent upon at least one of: the mobile terminal's position or situation relative to the adjacent base station.

4. The method of claim 1, wherein the first parameter value is a maximum signal power level to be transmitted by the mobile terminal, and the step of determining the first parameter value includes determining a maximum acceptable received signal power level from the mobile terminal at the adjacent base station.

5. In a mobile telecommunications network including a mobile terminal, a first base station and one or more adjacent base stations, a method of mitigating interference to the one or more adjacent base stations where the mobile terminal is configured to communicate with the network via the first base station, the method comprising:

determining a first parameter value indicative of a maximum acceptable level of interference by the mobile terminal on the adjacent base station;

using the first parameter value to determine a maximum operating threshold of the mobile terminal for communications with the first base station;

estimating an operating parameter level of the mobile terminal for a communication with the first base station in relation to a given service;

comparing the operating parameter level and the threshold; and where the operating parameter level exceeds the threshold, not proceeding with the communication.

6. The method of claim 5, wherein the first parameter value is determined using a parameter dependent upon at least one of: the mobile terminal's position or situation relative to the adjacent base station.

7. The method of claim 5, wherein the first parameter value is a maximum signal power level to be transmitted by the mobile terminal, and the step of determining the first parameter value includes determining a maximum acceptable received signal power level from the mobile terminal at the adjacent base station.

8. In a mobile telecommunications network including a mobile terminal, a first base station and one or more adjacent base stations, a method of mitigating interference to the one or more adjacent base stations where the mobile terminal is configured to communicate with the network via the first base station, the method comprising:

determining a first parameter value indicative of a maximum acceptable level of interference by the mobile terminal on the adjacent base station;

using the first parameter value to determine a maximum operating threshold of the mobile terminal for communications with the first base station; and determining the maximum operating threshold and an estimated operating parameter level at regular intervals whilst the mobile terminal is involved in a network communication via the first base station.

9. The method of claim 8, further comprising:

where the estimated operating parameter level exceeds the threshold:
a) offering the mobile terminal a lower service quality; or
b) ending the communication.

10. In a mobile telecommunications network including a mobile terminal, a first base station and one or more adjacent base stations, an apparatus to mitigate interference to the one or more adjacent base stations where the mobile terminal is configured to communicate with the network via the first base station, the apparatus comprising:

a parameter value determining device that determines a first parameter value indicative of a maximum acceptable level of interference by the mobile terminal on the adjacent base station;

a threshold determining device that uses the first parameter value to determine a maximum operating threshold of the mobile terminal for communications with the first base station;

a receiving device that receives a communication set up request for a given service;

an estimating device that estimates the operating parameter level of the mobile terminal for a communication with the first base station for the given service upon receiving a communication set up request; and, a controller that does not allow the communication set up request where the estimated operating parameter level exceeds the threshold.

11. The apparatus of claim 10, further comprising:

an offering device that offers the mobile terminal a lower service quality where the estimated operating parameter level exceeds the threshold, and wherein the step of not allowing the communication is performed in dependence on the mobile terminal not accepting the lower service quality.

12. The apparatus of claim 10, wherein the first parameter value is determined using a parameter dependent upon at least one of: the mobile terminal's position or situation relative to the adjacent base station.

13. The apparatus of claim 10, wherein the first parameter value is a maximum signal power level to be transmitted by the mobile terminal, and wherein the step of determining the first parameter value includes determining a maximum acceptable received signal power level from the mobile terminal at the adjacent base station.

14. The apparatus of claim 10, wherein the apparatus is a base station.

15. The apparatus of claim 14, wherein the base station is a micro base station.

16. In a mobile telecommunications network including a mobile terminal, a first base station and one or more adjacent base stations, an apparatus to mitigate interference to the one or more adjacent base stations where the mobile terminal is configured to communicate with the network via the first base station, the apparatus comprising:

a parameter value determining device that determines a first parameter value indicative of a maximum acceptable level of interference by the mobile terminal on the adjacent base station;

a threshold determining device that uses the first parameter value to determine a maximum operating threshold of the mobile terminal for communications with the first base station;

an estimating device that estimates an operating parameter level of the mobile terminal for a communication with the first base station in relation to a given service;

a comparing device that compares the operating parameter level and the threshold; and a controller that, where the operating parameter level exceeds the threshold, does not allow proceeding with the communication.

17. The apparatus of claim 16, wherein the first parameter value is determined using a parameter dependent upon at least one of: the mobile terminal's position or situation relative to the adjacent base station.

18. The apparatus of claim 16, wherein the first parameter value is a maximum signal power level to be transmitted by the mobile terminal, and wherein the step of determining the first parameter value includes determining a maximum acceptable received signal power level from the mobile terminal at the adjacent base station.

19. The apparatus of claim 16, wherein the apparatus is a micro base station.

20. In a mobile telecommunications network including a mobile terminal, a first base station and one or more adjacent base stations, an apparatus to mitigate interference to the one or more adjacent base stations where the mobile terminal is configured to communicate with the network via the first base station, the apparatus comprising:

a parameter value determining device that determines a first parameter value indicative of a maximum acceptable level of interference by the mobile terminal on the adjacent base station;

a threshold determining device that uses the first parameter value to determine a maximum operating threshold of the mobile terminal for communications with the first base station;

a maximum operating threshold determining device that determines the maximum operating threshold and an estimated operating parameter level at regular intervals whilst the mobile terminal is involved in a network communication via the first base station.

21. The apparatus of claim 20 further comprising:

where the estimated operating parameter level exceeds the threshold:
  a) an offering device that offers the mobile terminal a lower service quality; or
  b) a communication ending device that ends the communication.

* * * * *